May 31, 1927.

R. S. MINER 1,630,859

CIRCUIT SYSTEM FOR RADIOFREQUENCY CURRENTS

Filed April 2, 1923

INVENTOR
Robert S. Miner
BY Chapin T. Neal
ATTORNEYS

Patented May 31, 1927.

1,630,859

UNITED STATES PATENT OFFICE.

ROBERT S. MINER, OF WEST HARTFORD, CONNECTICUT, ASSIGNOR, BY MESNE ASSIGNMENTS, OF ONE-HALF TO THE C. D. TUSKA COMPANY, A CORPORATION OF CONNECTICUT.

CIRCUIT SYSTEM FOR RADIOFREQUENCY CURRENTS.

Application filed April 2, 1923. Serial No. 629,389.

This invention relates to circuit systems employing a three electrode vacuum tube for the amplification and rectification of oscillation currents of ultra audio or radio frequency.

In the well known regenerative circuit the typical example of which is shown in the patent to Armstrong 1,113,149, Oct. 6, 1914, the received oscillations impressed on the grid circuit set up amplified oscillations in the plate circuit which through various forms of coupling is permitted to feed back energy to the grid circuit for reamplification. This regenerative effect if carried too far will give rise to spontaneous oscillations set up within the system itself, independently of any outside source of power, which interfere with the signal oscillations. Such self-generated oscillations are due to the fact that the continually amplified oscillations in the plate circuit finally reach a point at which, as much if not more energy is fed back to the grid circuit from the plate circuit as is used up in overcoming the resistance of the grid circuit whereby the cycle becomes continuous, deriving energy therefore from the plate battery.

The breaking of such a circuit into self-generated oscillations therefor sets limits to the amount of signal amplification which may be obtained by the regenerative effect, and more particularly sets limits to the degree of tuning permissible for the plate and grid circuits, inasmuch as, before said circuits can be tuned to resonance, the feed back effect will be of such strength as to set up the spontaneous oscillations. Assuming that the feed back coupling is due solely to the capacity of the elements in the tube, it is found that at ultra audio or radio frequencies of impressed grid voltages, such a system will break into spontaneous or self-generated oscillations before the plate circuit can be fully tuned to resonance with the grid circuit.

The tendency of such a system to break into said spontaneous oscillations can be prevented by the provision of means to oppose the feeding back of energy from the plate circuit to the grid circuit. Under such conditions the plate circuit and grid circuit may be tuned to exact resonance without generating spontaneous oscillations, and as a consequence of the resonance thus obtainable the maximum amplifying power of the tube may be attained. The necessary tuning to resonance of the plate and grid circuits for obtaining this maximum amplifying power of the tube will in turn greatly improve the selective qualities of the system.

The means which I have chosen for preventing such spontaneous oscillations in the system consists in providing what I call a reverse feed back coil in a resonant plate circuit designed to act inductively upon a coil in a resonant grid circuit and so related to the grid circuit coil that the plate currents through it will generate a counter-electromotive force in opposition to the electromotive force induced in said grid circuit through the capacitative coupling of the tube. In other words, the reverse feed back coil and grid circuit coil will be arranged so as to buck one another at all times. The value of said counter-electromotive force exerted by the reverse feed back coil should be so adjusted as to be just sufficient to offset the tendency of the tube to generate oscillations through the capacitative coupling in the tube. In this way the tube can be kept under control, notwithstanding the tuning of the plate and grid circuits into exact resonance.

While my improved circuit has great value in connection with a vacuum tube used as a detector, a far greater advantage is derived therefrom when the controlled tube is used as a radio frequency amplifier, and a following detector tube is employed to rectify the amplified oscillations, thereby taking advantage of the fact that in a properly adjusted vacuum tube rectifier the output of the tube increases approximately as the square of the applied grid voltage.

A suitable arrangement of circuits for accomplishing the results set forth will now be described in connection with the accompanying drawings in which.

Figure 1:
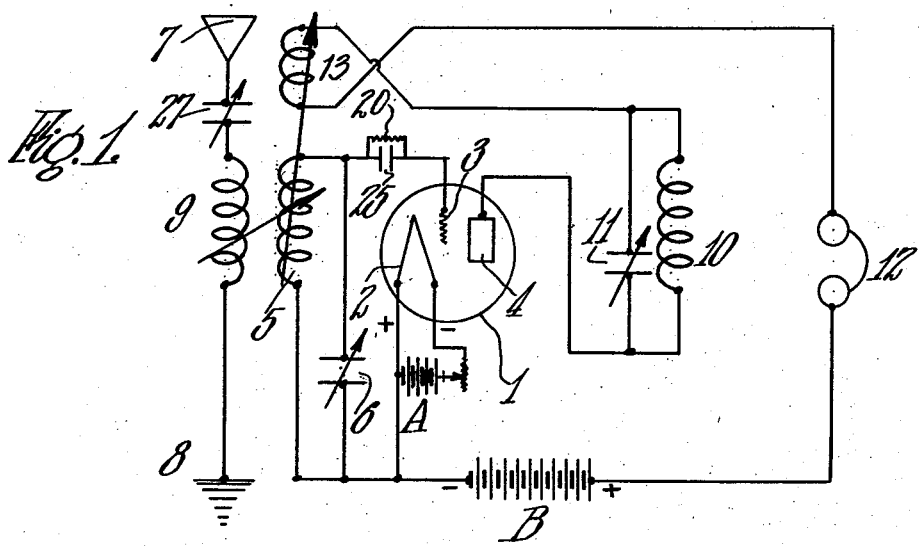
Fig. 1 shows the typical connections of a regenerative circuit having therein a reverse feed back coil to oppose the regenerative action.

Referring more particularly to Fig. 1 of the drawings which shows a simplified form of detector tube circuit employing said invention, the vacuum tube is indicated at 1 having the usual filament 2, grid 3 and plate 4. The battery for heating the filament is indicated at A and the battery for establishing the potentials of the plate and filament is indicated at B.

The grid circuit or input circuit of the system connected between the grid 3 and filament 2 includes the inductance coil 5 and variable capacity 6 in shunt therewith whereby said circuit may be tuned in parallel resonance. The coil 5 is the secondary of the usual transformer and is adapted to receive the impressed oscillations from any suitable outside source, here shown as an antenna 7, grounded at 8 and including an inductance coil 9 serving as the primary of said transformer. The coupling of the coils 9 and 5 may be variable as indicated and a variable capacity 27 may be included in the antenna circuit for tuning if desired. The usual grid condenser 25 and grid leak 20 is included in the grid circuit.

The plate circuit or output circuit is connected between the plate 4 and filament 2 and includes in addition to the battery B and telephone receiver 12 the usual inductance coil 10 and variable capacity 11 in shunt therewith whereby it likewise may be tuned in parallel resonance.

Also included in the plate circuit as shown is a supplemental reverse feed-back coil 13 arranged in series between said parallel resonance circuit 10, 11 and the filament 2, said coil 13 also being located in inductive relation with the impedance coil 5 of the grid parallel resonance circuit so as to couple the plate circuit and grid circuit magnetically. The coil 13 is so connected in the plate circuit as to be in bucking relation as distinguished from boosting relation, with the coil 5. This is diagrammatically illustrated in the drawing by crossing the leads to said reverse feed-back coil. In other words, the electromotive force generated by the oscillating plate currents flowing in said coil 13 opposes rather than assists the oscillations in said coil 5. By adjusting the degree of coupling between said coils 13 and 5 this opposing electromotive force of coil 13 may be made just sufficient to counteract or offset the electromotive force induced in said grid circuit by the plate currents through the capacitative coupling of said tube. When these oppositely acting electromotive forces just balance one another no energy will be fed from the plate circuit back into the grid circuit although in practice the reverse feed-back coil 13 should preferably be adjusted to a degree sufficient merely to overcome enough of the postive capacitative feed-back through the tube to keep the tube from oscillating when said grid and plate circuits are tuned. The attainment of such a result is one of great advantage in the use of a tube either for radio frequency amplification or detection in that it permits tuning of the plate and grid circuits to exact resonance without causing the objectionable spontaneous oscillations referred to.

It will be noted that the reverse feed back coil 13 is located in the low potential portion of the plate circuit; in other words between the parallel resonance circuit 10, 11 and the filament connection of said plate circuit. The importance of this location for the coil 13 will be appreciated from the following considerations. The positive feed back of energy from the plate circuit to the grid circuit which, carried far enough, causes self sustained oscillation to take place, as is generally understood, through capacitative coupling between the plate circuit and the grid circuit. While one capacitative coupling is provided between the elements of the vacuum tube, another is provided between the coils 13 and 5 when located adjacent one another because at radio frequencies the proximity of such coils has a condenser effect. However, the capacitative coupling between coils 13 and 5 may be minimized by locating the coil 13 in that portion of the plate circuit through which the potential variation is close to the minimum at all times, namely adjacent the filament. Highest potential variations take place on the plate side of the parallel resonance circuit and the least potential variations take place on the filament side thereof; consequently, for the efficient operation of this circuit, the coil 13 should be on the filament side of the parallel resonance circuit 10, 11 as shown.

By tuning said circuits to exact resonance the strength of incoming signals will be magnified to a far greater extent and much weaker signals will be picked up and rendered audible than with the usual regenerative circuits which can not be tuned to resonance without setting up spontaneous oscillations. It will also be found that little or no distortion of speech will be caused by the reception of signals with the circuit system such as I have described, even when adjusted to the point of greatest magnifying power.

Figure 2:
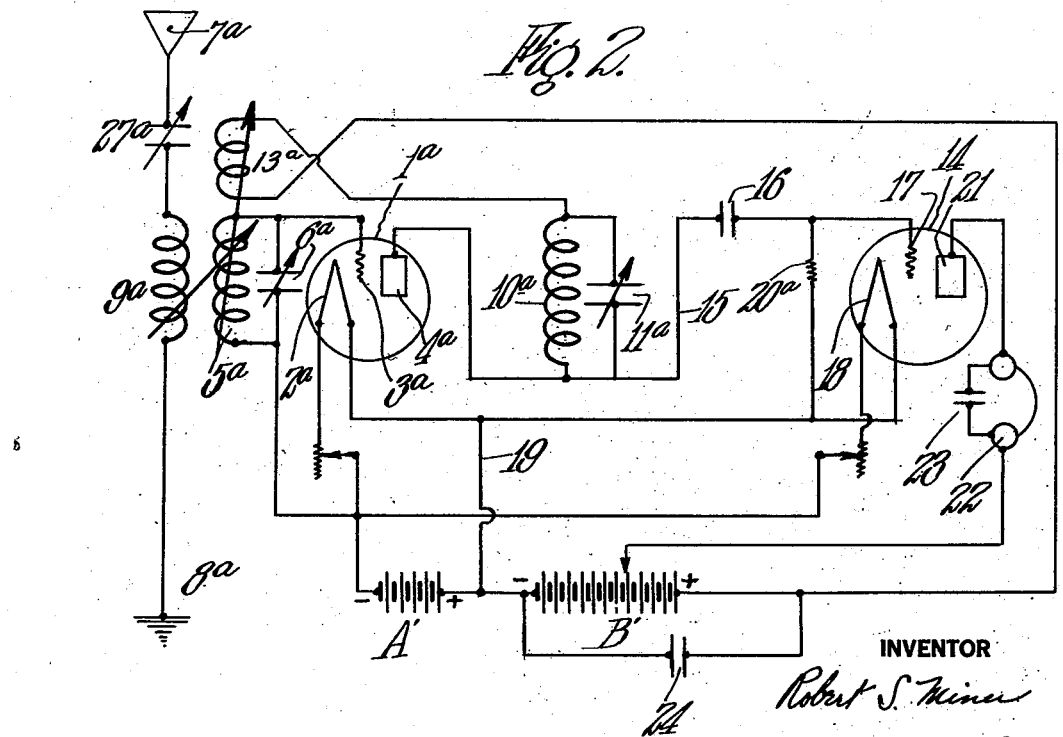
Fig. 2 shows the present improved circuit and tube as a radio frequency amplifier, with a following tube as a detector.

As before stated, my system can be advantageously utilized to give superior results with a tube acting as a combined rectifier and amplifier of radio frequencies as shown in Fig. 1, but I have found its value considerably enhanced by employing it with a tube first for amplifying the radio frequency oscillations together with a second tube for rectifying as shown in Fig. 2. The circuit system in this figure will be readily understood from what has been said of Fig. 1 since the same principle is employed in both circuits.

It may be briefly described as follows: 1ª is a three electrode vacuum tube acting solely as an amplifier of radio frequency oscillations having therein, the filament 2ª, grid 3ª, and plate 4ª. The grid circuit includes the secondary coil 5ª of the transformer upon which the oscillations may be impressed by the primary coil 9ª of an antenna 7ª. The coupling of coils 9ª and 5ª may be variable as indicated, while the antenna circuit may be grounded at 8ª and have a variable capacity 27ª for tuning the same. The grid circuit includes a variable capacity 6ª in shunt with the coil 5ª for tuning said circuit in parallel resonance. The plate circuit includes the inductance or impedance coil 10ª and variable capacity 11ª in shunt therewith for tuning said circuit in parallel resonance and, as shown, also includes the supplemental reverse feed-back coil 13ª arranged in series between the parallel resonance circuit 10ª, 11ª and the filament 2ª, as in Fig. 1. B' indicates the plate circuit battery, the positive side of which is connected to the plate 4ª. The coil 13ª functions precisely the same as coil 13 of Fig. 1 and for this purpose is in inductive relation so as to buck the inductance or impedance coil 5ª of the grid parallel resonance circuit.

The plate circuit of the amplifier 1ª is suitably coupled to the grid circuit of the following rectifier tube 14, through the impedance of the parallel resonance circuit 10ª, 11ª, by line 15 through condenser 16 to the grid 17 of said tube. The filament 18 of said rectifier 14 is connected by a common lead 19 from both filaments to the negative side of battery B'. Battery A' is connected as shown to both filaments for heating the same. The usual grid leak 20ª is connected between the grid 17 and filament 18. The plate 21 in tube 14 is connected through a telephone receiver 22 to the positive side of battery B'. The telephone 22 may be shunted by a by-pass condenser 23 and the battery B' may be shunted by a by-pass condenser 24 if desired.

By the arrangement shown not only may the grid and plate circuits be tuned to resonance without causing the tube 1ª to break into oscillation but by employing the maximum impedance of the parallel resonance combination 10ª, 11ª of said plate circuit (which theoretically is infinite when tuned) for coupling the output of said tube 1ª to the input of tube 14, the greatest possible voltage impulse from the amplifier is transferred to the grid of the detector tube 14.

As an aid in the practice of said invention the following constants are given, reference being made to the elements of Fig. 2. It is assumed that the aerial, in this case constituting the source of power for impressing oscillations on the secondary 5ª is suitably designed for the reception of wave lengths of approximately 300 to 600 meters. The inductances of coils 5ª and 10ª are each 20 micro-henries. The capacity of condensers 6ª and 11ª are each .0005 microfarads. The inductance of the coil 13ª is 12 micro-henries but this inductance may be varied within wide limits due to the adjustable coupling for said coil. The capacity of condenser 16 is .00025 microfarads and this condenser should have the greatest value of d. c. resistance possible. The capacity of the by-pass condensers 23 and 24 is .0005 microfarads. Battery A' is of 6 volts. Battery B' is of 100 volts with means for varying the potential of plate 21 as shown. The audions 1ª and 14 which I have used successively are commercially known as the R. C. A. 201 A tubes. The resistance of the grid leak 20ª is 3 megohms. 22 is any suitable high resistance telephone receiver.

It is to be understood that the foregoing constants are given as an approximation solely and are such as I have found to work out satisfactorily in practice. Obviously no limitation of the invention is to be imputed therefrom or from the conventional character of my disclosure.

What I claim is:

1. A circuit system for radio frequency currents comprising, a vacuum tube having a grid, plate and filament therein, a grid circuit therefor tuned to resonance including an inductance coil, a plate circuit therefor tuned to resonance including an inductance coil and a condenser in shunt therewith to furnish impedance of parallel resonance, said plate circuit also having a reverse feed back coil therein arranged in coupling relation to the coil in said grid circuit in a manner to oppose the effect of the inherent capacitive coupling between said grid and plate circuits, and a second vacuum tube having a grid, plate and filament therein and having its grid directly connected to the plate of said first tube through a condenser.

2. A circuit system for radio frequency currents comprising, a vacuum tube having a grid, plate and filament therein having its grid and plate each connected respectively to a parallel resonance circuit comprising an inductance coil and a condenser in shunt therewith, said grid and plate circuits being coupled by a supplemental reverse feed back coil in said plate circuit arranged in inductive relation to the impedance coil of said grid parallel resonance circuit in a manner to oppose the effect of the inherent capacitative coupling between said grid and plate circuits through the tube.

3. A circuit system for radio frequency currents comprising a vacuum tube having a grid, plate and filament therein having its grid and plate each connected respectively to a parallel resonance circuit comprising an inductance coil and a condenser in shunt therewith, said grid and plate circuits being coupled by a supplemental reverse feed back coil in said plate circuit between the filament of said tube and the parallel resonance circuit of said plate and arranged in inductive relation to the impedance coil of said grid parallel resonance circuit in a manner to oppose the effect of the inherent capacitative coupling between said grid and plate circuits through the tube.

4. A circuit system for radio frequency currents comprising, a vacuum tube having a grid, plate and filament therein and having its grid and plate each connected respectively to a parallel resonance circuit comprising an inductance coil and a condenser in shunt therewith whereby said circuits may be tuned to resonance, said grid and plate circuits being coupled by a supplemental reverse feed back coil in said plate circuit between the filament of said tube and the parallel resonance circuit of said plate, and arranged in inductive relation to the impedance coil of said grid parallel resonance circuit in a manner to oppose the effect of the inherent capacitative coupling between said grid and plate circuits, and a second tube having a grid, plate and filament therein and having its grid directly connected to the plate of said first tube.

In testimony whereof I have affixed my signature.

ROBERT S. MINER.